(12) United States Patent
Toonssen

(10) Patent No.: US 11,725,543 B2
(45) Date of Patent: Aug. 15, 2023

(54) EXHAUST DUCT FOR A FOSSIL FUEL POWERED ENGINE COMPRISING A DILUTION SELECTIVE CATALYTIC REDUCTION SYSTEM

(71) Applicant: NEM ENERGY B.V., Amsterdam (NL)

(72) Inventor: Richard Toonssen, Pijnacker (NL)

(73) Assignee: NEM ENERGY B.V., Zoeterwoude (NL)

( * ) Notice: Subject to any disclaimer, the term of this patent is extended or adjusted under 35 U.S.C. 154(b) by 268 days.

(21) Appl. No.: 16/470,223

(22) PCT Filed: Jan. 11, 2018

(86) PCT No.: PCT/EP2018/050670
§ 371 (c)(1),
(2) Date: Jun. 16, 2019

(87) PCT Pub. No.: WO2018/137936
PCT Pub. Date: Aug. 2, 2018

(65) Prior Publication Data
US 2019/0345845 A1   Nov. 14, 2019

(30) Foreign Application Priority Data
Jan. 27, 2017 (EP) ..................................... 17153522

(51) Int. Cl.
*F01D 25/30* (2006.01)
*B01D 53/94* (2006.01)
(Continued)

(52) U.S. Cl.
CPC ....... *F01D 25/305* (2013.01); *B01D 53/9431* (2013.01); *B01F 23/2132* (2022.01);
(Continued)

(58) Field of Classification Search
None
See application file for complete search history.

(56) References Cited

U.S. PATENT DOCUMENTS

| 4,178,758 A | 12/1979 | Paull et al. |
| 5,380,499 A | 1/1995 | MacInnis |

(Continued)

FOREIGN PATENT DOCUMENTS

| CN | 102022214 A | 4/2011 |
| JP | S5217610 Y2 | 4/1977 |

(Continued)

OTHER PUBLICATIONS

PCT International Search Report and Written Opinion of International Searching Authority dated Sep. 5, 2018 corresponding to PCT International Application No. PCT/ PCT/EP2018/050670 filed Nov. 1, 2018.

*Primary Examiner* — Ehud Gartenberg
*Assistant Examiner* — Jacek Lisowski
(74) *Attorney, Agent, or Firm* — Grossman, Tucker, Perreault & Pfleger, PLLC

(57) ABSTRACT

An exhaust duct for a fossil fuel powered engine includes an exhaust gas passage, a cooling fluid passage, a mixing device for mixing cooling fluid with the hot exhaust gas and a selective catalytic reduction catalyst for removing nitrogen oxides arranged in the exhaust gas passage. The mixing device has a mixing chamber with a first wall and an opposed second wall, the first and second wall arranged upstream of the selective catalytic reduction catalyst in the exhaust gas passage and extending over the cross-sectional area of the exhaust gas passage, both walls perforated by through holes, wherein through holes of the first wall are connected with through holes of the second wall in pairs by pipes extending through the mixing chamber, the pipes (Continued)

perforated by at least one hole into the mixing chamber and the cooling fluid passage ending into the mixing chamber.

22 Claims, 5 Drawing Sheets

(51) Int. Cl.
| | |
|---|---|
| *F01N 3/20* | (2006.01) |
| *F01N 3/28* | (2006.01) |
| *F02C 7/141* | (2006.01) |
| *F02C 7/18* | (2006.01) |
| *B01F 23/70* | (2022.01) |
| *B01F 23/213* | (2022.01) |
| *B01F 25/313* | (2022.01) |
| *B01F 25/314* | (2022.01) |

(52) U.S. Cl.
CPC ...... *B01F 23/702* (2022.01); *B01F 25/31331* (2022.01); *B01F 25/31434* (2022.01); *F01N 3/2066* (2013.01); *F01N 3/2892* (2013.01); *F02C 7/141* (2013.01); *F02C 7/18* (2013.01); *F01N 2610/02* (2013.01); *F01N 2610/11* (2013.01); *F05D 2220/32* (2013.01); *F05D 2260/232* (2013.01)

(56) References Cited

U.S. PATENT DOCUMENTS

| | | |
|---|---|---|
| 5,461,853 A | 10/1995 | Vetterick |
| 2006/0191254 A1 | 8/2006 | Bui et al. |
| 2007/0053237 A1* | 3/2007 | Yoshida ............... B01F 5/0463 366/165.1 |
| 2010/0316492 A1 | 12/2010 | Charron et al. |
| 2011/0030331 A1* | 2/2011 | Tong .................... F01N 3/2066 60/39.5 |
| 2011/0036066 A1 | 2/2011 | Zhang et al. |
| 2011/0158876 A1 | 6/2011 | Buzanowski et al. |
| 2014/0230444 A1 | 8/2014 | Hao et al. |
| 2015/0041014 A1 | 2/2015 | Ferguson |
| 2016/0341093 A1* | 11/2016 | Zhang ............... B01D 53/8631 |
| 2016/0376908 A1 | 12/2016 | Reed et al. |
| 2017/0058742 A1* | 3/2017 | Zhang .................... F01D 25/305 |
| 2017/0087515 A1* | 3/2017 | Huang .................... B01J 23/40 |
| 2017/0182442 A1* | 6/2017 | Kippel ............... B01D 46/0086 |

FOREIGN PATENT DOCUMENTS

| | | |
|---|---|---|
| JP | 2001032711 A | 2/2001 |
| JP | 2011032711 A | 2/2011 |
| JP | 4688695 B2 | 5/2011 |
| JP | 2017015076 A | 1/2017 |
| KR | 20070108192 A | 11/2007 |
| WO | 2014039040 A1 | 3/2014 |

* cited by examiner though holes of the second wall in pairs by pipes extending through the mixing chamber, the pipes perforated by at least one hole into the mixing chamber and the cooling fluid passage ending into the mixing chamber.

EXHAUST DUCT FOR A FOSSIL FUEL POWERED ENGINE COMPRISING A DILUTION SELECTIVE CATALYTIC REDUCTION SYSTEM

CROSS REFERENCE TO RELATED APPLICATIONS

This application is the US National Stage of International Application No. PCT/EP2018/050670 filed Jan. 11, 2018, and claims the benefit thereof. The International Application claims the benefit of European Application No. EP17153522 filed Jan. 27, 2017. All of the applications are incorporated by reference herein in their entirety.

FIELD OF INVENTION

The present invention relates to an exhaust duct for a fossil fuel powered engine comprising a dilution selective catalytic reduction system.

The exhaust duct comprising: an exhaust gas passage, a cooling fluid passage, a mixing device for mixing cooling fluid with hot exhaust gas and at least a selective catalytic reduction catalyst (SCR catalyst) arranged in the exhaust gas passage for removing nitrogen oxides ($NO_x$) and at least first means for supplying a reducing agent.

Additional to that, the present invention relates to a mixing device for such an exhaust duct and a power plant.

The invention relates to the field of waste gas purification of a fossil fuel powered engine, especially to the field of waste gas purification for a simple cycle gas turbine and a power plant comprising a gas turbine, in particular a simple cycle gas turbine. In the exhaust gas discharged by fossil fuel powered engines, various harmful substances are contained due to the combustion of the fossil fuel. Such harmful substances include carbon monoxide (CO) and nitrogen oxides ($NO_x$). Regulations on discharged amount of these harmful substances have been strengthening, so that there is a need for improvement of the state of the art systems for flue gas cleaning.

BACKGROUND OF INVENTION

Simple cycle gas turbines are used for power production during peak electricity demands. These gas turbines operate for relatively short time periods and often at part load. A power plant with a simple cycle gas turbine has only one power cycle compared to a combined cycle power plant comprising a gas turbine and a steam turbine. The most power plants with a gas turbine emit the flue gas without treatment into the atmosphere. The compounds to be removed are mainly nitrogen oxides ($NO_x$) and carbon monoxide (CO).

For the removal of both substances, it has been suggested to use a catalytic process for cleaning the flue gas of a simple cycle gas turbine. The catalysts (catalyzers) can handle temperatures up to 425° C., which is lower than most gas turbine exhaust temperatures (approximately 600° C.). The suggested process for $NO_x$ removal from the exhaust gas of a simple cycle gas turbine is known as selective catalytic reduction (SCR) and involves an injection of an reducing agent (ammonia $NH_3$ and/or urea) into the flue gas prior to pass it through a selective catalytic reduction catalyzer. A dilution system has been suggested to cool the flue gas, by supplying cold ambient air to the waste gas stream, to an appropriate temperature for the catalyzer. Such a catalytic process for $NO_x$ removal is called dilution-SCR. The suggested process for CO removal from the exhaust gas of the simple cycle gas turbine uses a catalyzer.

If an exhaust duct of a simple cycle gas turbine is equipped with a dilution-SCR system as suggested, some of the following problems might arise: —Poor mixing of the hot flue gas and the cooling gas, —Different $NO_x$ concentration profiles at different gas turbine loads. The injection of the reducing agent ammonia and/or urea needs to be matched with the $NO_x$ concentration profile, which is hardly possible in an exhaust duct of a gas turbine equipped with a dilution-SCR system, —In part load operation of the simple cycle gas turbine, the gas turbine exhaust velocity profile is very different from the full load gas turbine exhaust velocity profile. This can lead to very non uniform velocity profiles at the catalyzer. This result in varying residence time throughout the catalyzer and can lead to poor conversion of $NO_x$ and reducing agent (unconverted ammonia and/or urea exiting the catalyzer—referred to as $NH_3$ slip).

SUMMARY OF INVENTION

The invention is based on the object of specifying an exhaust duct, of the type stated at the outset, for a fossil fuel powered engine, in particular for a simple cycle gas turbine, a mixing device comprised by such an exhaust duct, and a power plant comprising a gas turbine and an exhaust duct, by means of which it is possible to reduce emission of pollutants during operation.

The object is achieved, according to the invention, in the case of an exhaust duct of the type stated at the outset, in that the mixing device comprising a mixing chamber with a first wall and an opposed second wall, the first and second wall arranged upstream of the selective catalytic reduction catalyst in the exhaust gas passage and extending over the cross-sectional area of the exhaust gas passage, both walls perforated by through holes, wherein through holes of the first wall are connected with through holes of the second wall in pairs by pipes extending through the mixing chamber, the pipes perforated by at least one hole into the mixing chamber and the cooling fluid passage ending into the mixing chamber.

The cooling fluid might be ambient air or a cooling gas or a mixture of cooling air/gas with steam or vapour or droplets of a liquid.

The first and second wall of the mixing chamber might be constructed as plates, which are perforated by through holes.

It is thus proposed, to equip the exhaust duct with a mixing chamber according to the invention for supplying the cooling fluid into the exhaust gas passage. The mixing chamber according to the invention acts like a flow straightener for the flue gas homogenizing the velocity profile of the flue gas over the cross-sectional area of the exhaust gas passage. Additional to that, the mixing chamber acts like a cooling fluid injector, wherein the cooling fluid (for example ambient air) is injected in a homogeneous way into the exhaust gas passage with the advantage, that the amount of cooling fluid sucked from the mixing chamber into the pipes increase with the velocity of the flue gas in the pipes due to the static pressure in the pipe. This keeps the ratio between cooling fluid and flue gas of the mixed stream more constant in case of different velocity profiles of the flue gas due to varying operational states of the fossil fuel powered engine. A more constant ratio between cooling fluid and flue gas results in a homogeneous temperature and velocity profile at the at least one catalyzer reducing the emission of pollutions due to optimized conditions at the at least one catalyzer. The mixing chamber works self-adjusting regarding the amount of cooling fluid injected into the exhaust gas passage.

Advantageous designs of the invention are specified in the following description and the dependent claims, the features of which may be applied individually and in any combination with one another.

It may be provided, advantageously, that the first means for supplying a reducing agent are arranged in such a way, that reducing agent is supplied into the cooling fluid passage.

Because the velocity profile of the cooling fluid of the cooling fluid passage is less influenced by different gas turbine loads then the waste gas velocity in the exhaust gas passage, a more constant ratio between reducing agent and cooling fluid results, wherein the cooling fluid and reducing agent is injected together via the mixing chamber into the flue gas, the outcome of this is a more constant ratio between reducing agent and flue gas than in case of the state-of-the-art injection of the reducing agent directly into the exhaust gas passage. Due to the less fluctuating ratio between reducing agent and flue gas (reduced NH3 slip), the emission of pollutions is reduced.

Advantageously, it may further be provided that the first means for supplying a reducing agent are arranged in such a way, that the reducing agent is injected at the fluid intake of a cooling fluid fan of the cooling fluid passage.

The reducing agent and the cooling fluid are mixed by the cooling fluid fan resulting in a homogenous mixture of reducing agent and cooling fluid.

It may also be considered to be advantageous that the first means for supplying a reducing agent are adapted for supplying reducing agent comprising a urea component and/or an ammonia (NH3) component.

The use of ammonia or urea as reducing agent is well-proven for the selective catalytic reduction.

It may also be considered to be advantageous that the first means for supplying a reducing agent comprising one or several injection nozzles adapted to spray the reducing agent as a liquid or vapour into the cooling fluid.

It may also be considered to be advantageous that the pipes of the mixing chamber comprising inside at least one turbulator for increasing the turbulence of the exhaust gas flowing through the pipes.

This results in an improved mixing of the cooling fluid comprising the reducing agent and the flue gas to increase the elimination of the NOx in the flue gas. The turbulator can be constructed as a fin or a blind hole. The pipes can be constructed inside as throttled pipes.

It may also be considered to be advantageous that the sum of the cross-sectional area of the through holes in the first and second wall are adapted to keep a pressure drop between an inlet of the exhaust gas passage and a downstream exit of the exhaust gas passage less or equal than 25 mbar, advantageously the sum is 25% of the surface area of the first and second wall.

The pressure drop between the front side at the first wall and the reverse side at the second wall of the mixing chamber might be for example 11 mbar to meet the condition of a pressure drop of less or equal 25 mbar between an inlet of the exhaust gas passage and a downstream exit of the exhaust gas passage for an exhaust duct of a simple cycle gas turbine for a power plant. The mixing chamber might comprise par example 150 pipes in case the sum of the cross-sectional area of the through holes is 25% of the surface of the first and second wall for the dimension of an exhaust duct of a simple cycle gas turbine for a power plant.

It may also be considered to be advantageous that the openings of the through holes through the first and second wall are uniformly distributed on the surface of the first and second wall.

This improves the ability of the mixing chamber to act as a flow straightener.

It is a further object of the invention to specify a power plant comprising a gas turbine, preferentially a simple cycle gas turbine, and an exhaust duct, by means of which it is made possible to reduce emissions of pollutants during operation.

For this purpose, the exhaust duct of the power plant is realized.

It is a further object of the invention to specify a mixing device for an exhaust duct, of the type stated at the outset, for a fossil fuel powered engine, for mixing cooling fluid with hot exhaust gas, by means of which it is made possible to reduce emissions of pollutants during operation.

The specified mixing device for this purpose is realized with a mixing chamber for an exhaust duct for mixing cooling fluid with hot exhaust gas comprising a first wall and an opposed second wall and at least one entrance for a cooling fluid passage of the exhaust duct, the first and second wall adapted to be arranged in an exhaust gas passage of the exhaust duct and to extend over the cross-sectional area of the exhaust gas passage, the first and second wall both perforated by through holes, wherein through holes of the first wall are connected with through holes of the second wall in pairs by pipes extending through the mixing chamber, the pipes perforated by at least one hole into the mixing chamber.

Further expedient designs and advantages are provided by the description of exemplary embodiments of the invention, with reference to the figure of the drawing, wherein components that have the same function are denoted by the same references.

BRIEF DESCRIPTION OF THE DRAWINGS

There are shown in

DETAILED DESCRIPTION OF INVENTION

Figure 1:
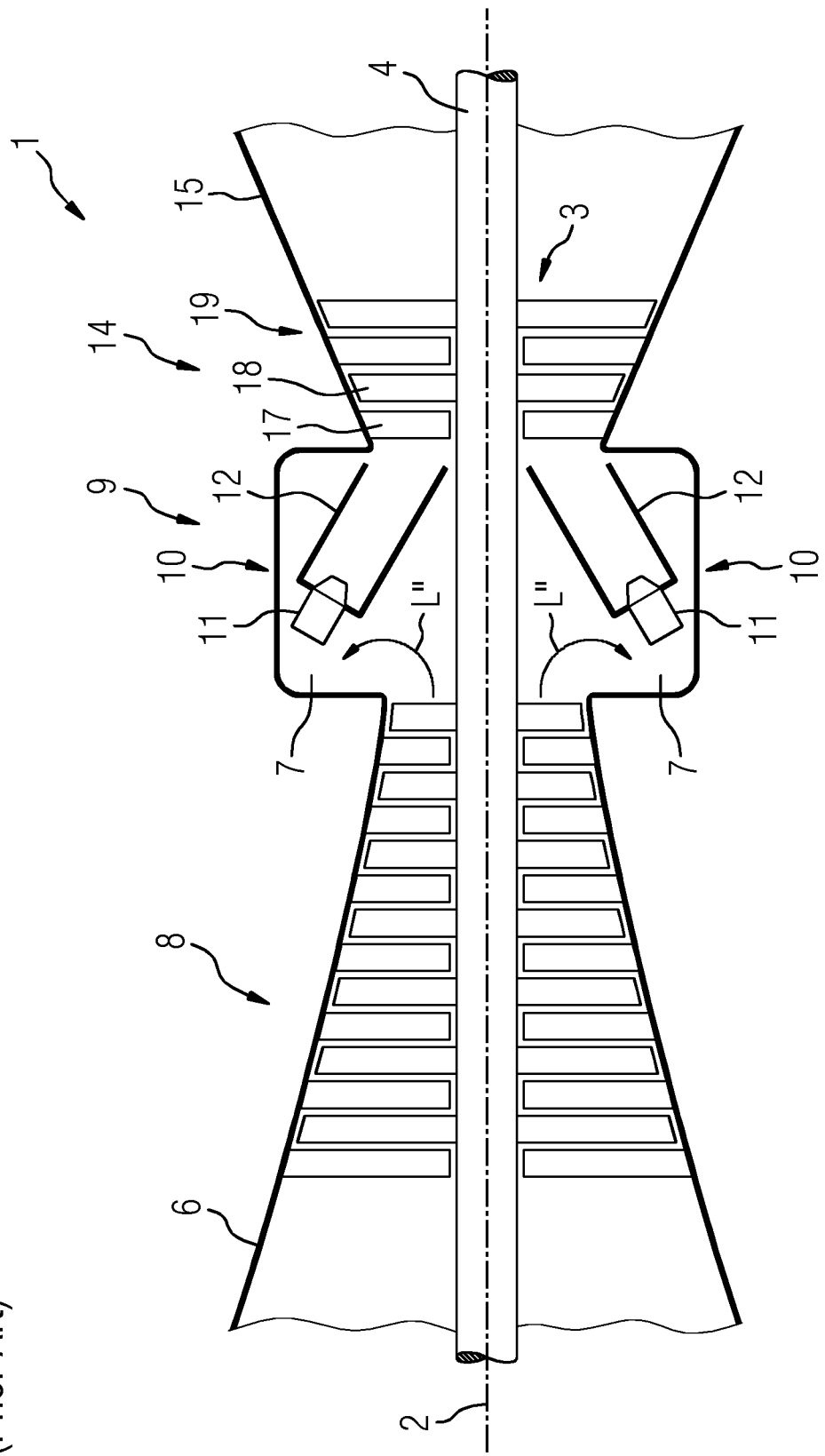
FIG. 1 a schematic representation of a gas turbine of the prior art, in a longitudinal section, FIG. 2 a schematic representation of a power plant with a simple cycle gas turbine, FIG. 3 a schematic representation of an exhaust duct for a gas turbine according to suggested art with a dilution-SCR system, in a longitudinal section, FIG. 4 a schematic representation of a mixing chamber according to the invention, in a perspective view, FIG. 5 a schematic representation of a pipe of the mixing chamber according to the invention, in a perspective view, and FIG. 6 a schematic representation of an exhaust duct according to the invention, in a perspective view.

FIG. 1 shows a sectional view of a gas turbine 1 according to the prior art, in a schematically simplified representation. In its interior, the gas turbine 1 has a rotor 3, which is mounted so as to be rotatable about a rotation axis 2, and which has a shaft 4, which is also referred to as a turbine rotor. Along the rotor 3, in succession, there is an intake housing 6, a compressor 8, a combustion system 9, having one or more combustion chambers 10, which each comprise a burner arrangement having burners 11, a fuel supply system (not represented) for the burners, and a combustion chamber housing 12, and a turbine 14 and an exhaust duct 15. The combustion chamber 10 may be, for example, an annular combustion chamber.

The combustion system 9 represented in FIG. 1 communicates with a, for example annular, hot-gas channel. There, a plurality of turbine stages connected in succession constituting the turbine 14. Each turbine stage is constituted by blade rings. As viewed in the direction of flow of a working medium, in the hot channel a row of guide blades 17 is succeeded by a row of rotor blades 18. The guide blades 17 in this case are fastened to an inner housing of a stator 19, whereas the rotor blades 18 of a row are attached, for example by means of a turbine disc, to the rotor 3. A generator (not represented), for example, is coupled to the rotor 3.

During operation of the gas turbine, air is sucked in through the intake housing 6 and compressed by the compressor 8. The compressor air L" provided at the turbine-side end of the compressor 8 is guided along a burner plenum 7 to the combustion system 9 where, in the region of the burner arrangement, it is routed into the burners 11 and in the latter is mixed with fuel and/or enriched with fuel in the outlet region of the burner 11. Fuel supply systems in this case supply the burners with fuel. The mixture, or the compressor air and the fuel, is/are discharged from the burners 11 into the combustion chamber 10 and combusts/combust, forming a hot stream of working gas in a combustion zone within the combustion chamber housing 12 of the combustion chamber. From there, the stream of working gas flows along the hot-gas channel, past the guide blades 17 and the rotor blades 18. At the rotor blades 18, the stream of working gas expands in an impulse-transmitting manner, such that the rotor blades 18 drive the rotor 3, and the latter drives the generator (not represented) coupled thereto.

Figure 2:
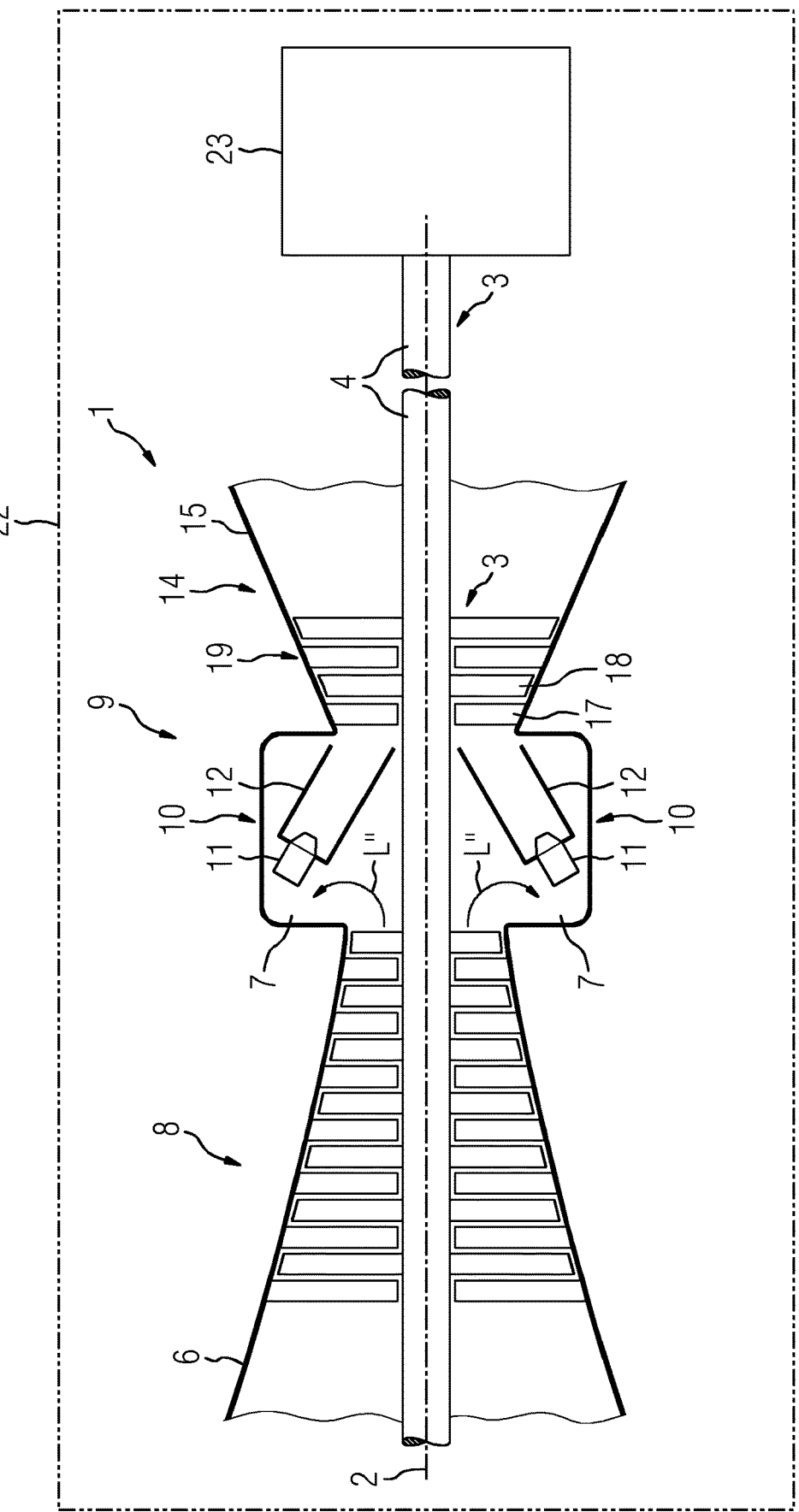

FIG. 2 shows a schematic representation of a power plant 22 according to prior art comprising a gas turbine 1, an exhaust duct 15 coupled to a turbine exit of the gas turbine 1 and a generator 23. The gas turbine 1 drives the rotor 3 during operation, and the rotor 3 drives the generator to generate electrical power. The hot flue gas leaving the exit port of the gas turbine 1 is flowing via the exhaust duct 15 into the atmosphere.

Figure 3:
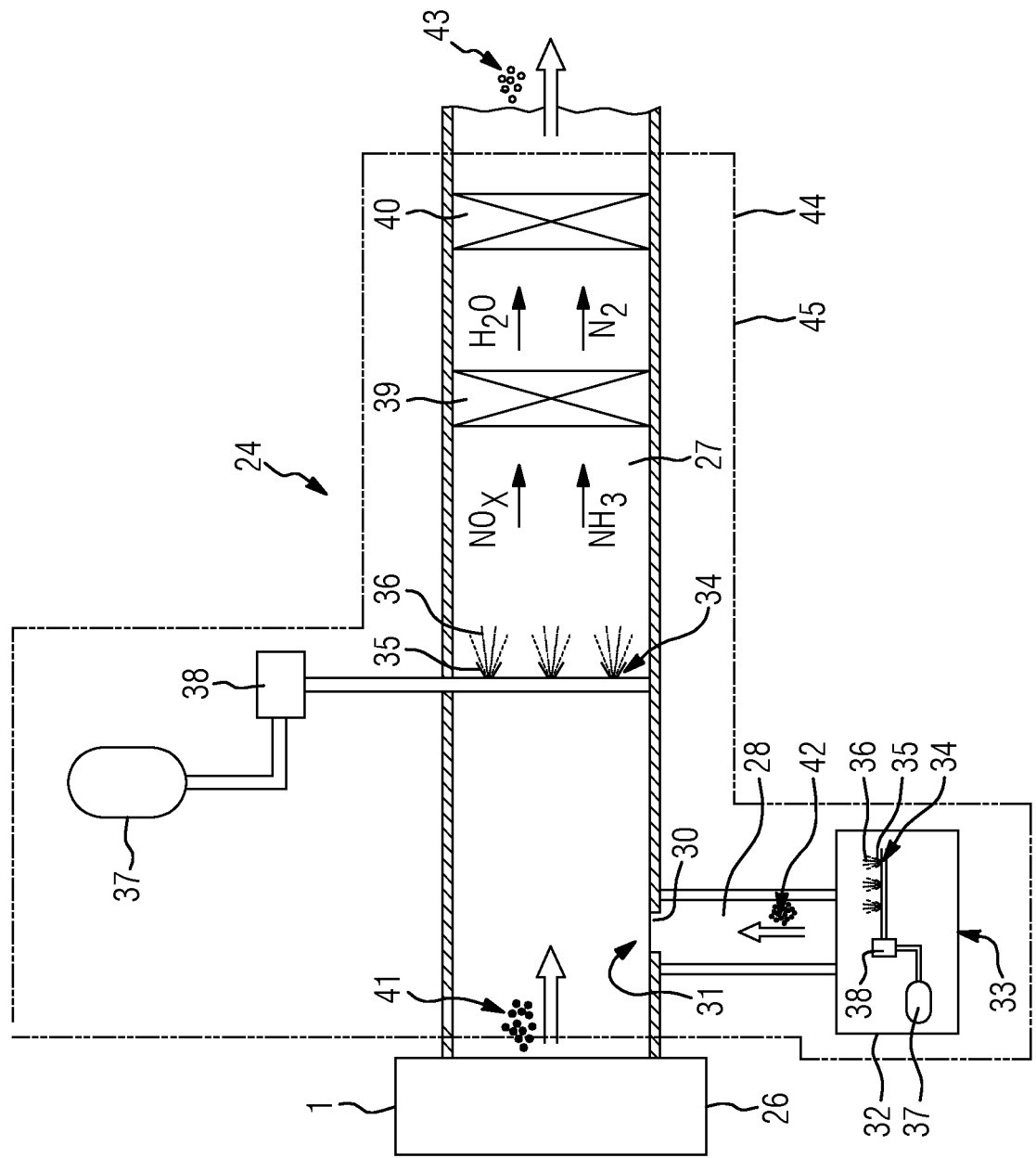

FIG. 3 shows schematically an exhaust duct 24 for a gas turbine 1 according to suggested art with a dilution selective catalytic reduction system (dilution-SCR system), in a longitudinal section. The gas turbine 1, which is a fossil fuel powered engine 26, is coupled with a turbine exit to an inlet of an exhaust duct 24. The exhaust duct 24 comprises an exhaust gas passage 27, wherein a cooling fluid passage 28 ends into the exhaust gas passage 27 via an entrance 30 for the cooling fluid passage 28. The entrance 30 acts as a mixing device 31. There is a cooling fluid fan 32 with a fluid intake 33 of the cooling fluid fan arranged at the opposite end of the cooling fluid passage 28. In an embodiment, downstream of the entrance 30 for the cooling fluid passage 28, there are first means 34 for supplying a reducing agent 36 arranged in the exhaust gas passage with injection nozzles 35 to spray reducing agent 36 into the exhaust gas passage 27. In another embodiment, another first means 34 for supplying a reducing agent 36 is arranged in so that the reducing agent is supplied to the cooling passage 28. The reducing agent 36 is injected at the fluid intake 33 of a cooling fluid fan 32 of the cooling fluid passage 28. The first means 34 for supplying a reducing agent are fluidic connected to a storage tank 37, wherein the flow of the reducing agent 36 to the first means 34 is controlled by a distribution & flow control unit 38. Downstream of the first means 34 for supplying a reducing agent is a selective catalytic reduction catalyst 39 (also referred as SCR catalyzer) arranged followed downstream by a CO catalyzer 40, wherein the catalyzers extending over the cross-sectional area of the exhaust gas passage 27. The catalyzers with the first means 34, the distribution & flow control unit 38, the storage tank 37 and the cooling fluid passage 28 with fluid fan 33 32 forming together an exhaust gas purification apparatus 44 and a dilution selective catalytic reduction system 45 (dilution SCR-system).

During operation, the exhaust gas 41 produced by the gas turbine 1 is flowing into the exhaust gas passage 27 of the exhaust duct 24 and mixed with cooling fluid 42 from the cooling fluid passage 28 and sprayed with reducing agent 36 by injection nozzles 35 of the first means 34. Due to the reducing agent 36, some of the $NO_x$ components of the exhaust gas are reduced by the selective catalytic reduction catalyst 39 into $H_2O$ and $N_2$. Some of the CO components of the fuel gas are eliminated by the CO catalyzer 40, wherein the purified fuel gas 43 leaves the exhaust duct at a downstream exit of the exhaust gas passage 27.

Figure 5:
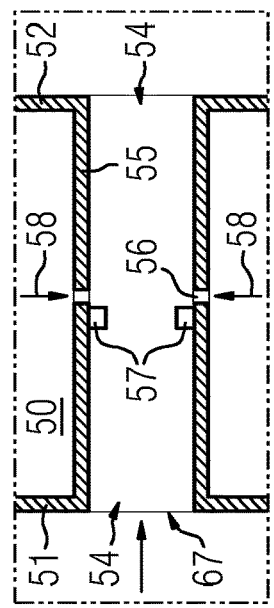
Figure 4:
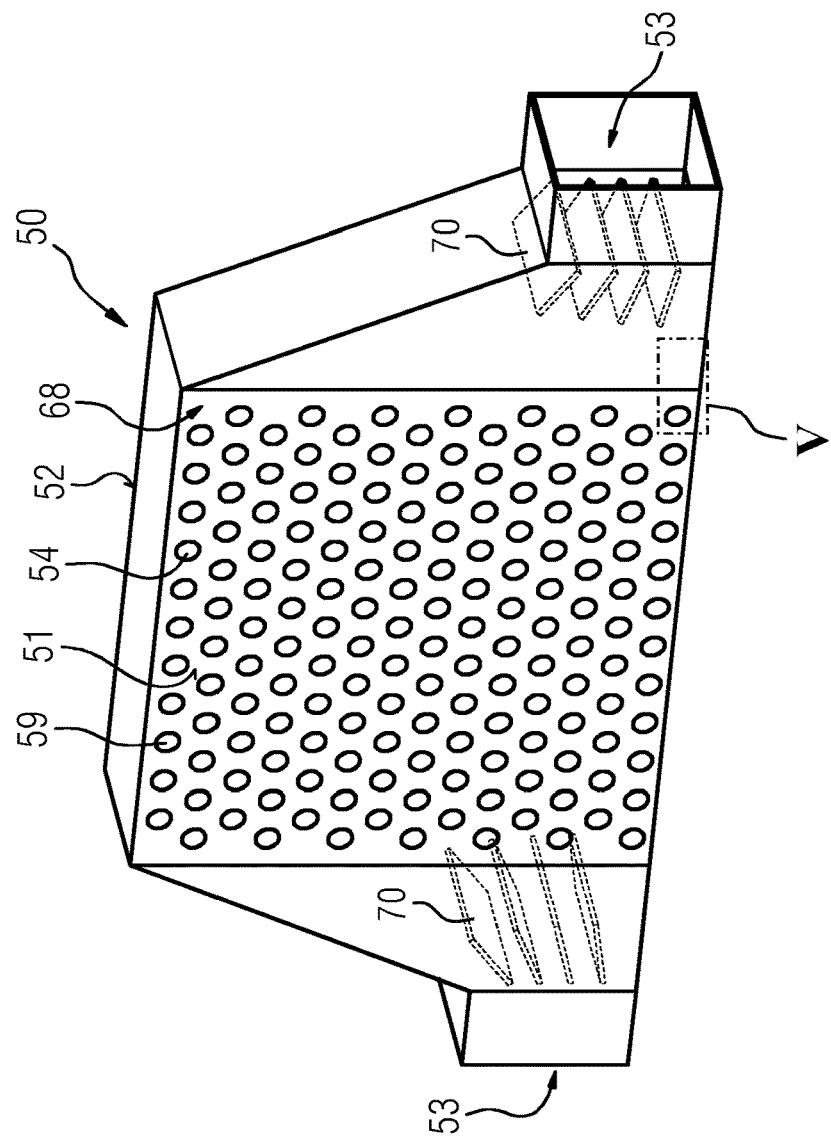

FIG. 4 shows schematically a mixing chamber 50 for an exhaust duct according to the invention. The mixing chamber 50 for mixing cooling fluid with hot exhaust gas comprising a first wall 51 and an opposed second wall 52 adapted to extend over the cross-sectional area of the exhaust gas passage, and at least one entrance 53 for a cooling fluid passage ending into the mixing chamber 50, the first wall 51 and the second wall 52 both perforated by through holes 54. As shown by FIG. 5 in more detail, the through holes 54 of the first wall 51 are connected with through holes 54 of the second wall 52 in pairs by pipes 55 extending through the mixing chamber 50, the pipes 55 perforated by at least one or two or more holes 56 into the mixing chamber 50. The sum of the cross-sectional areas 59 of the through holes 54 in the first wall 51 and second wall 52 are adapted to keep a pressure drop between an inlet (Pos. 66 of FIG. 6) of the exhaust gas passage and a downstream exit (Pos. 69 of FIG. 6) of the exhaust gas passage less or equal than 25 mbar. The openings 67 of the through holes 54 are uniformly distributed on the surface 68 of the first wall 51 and the second wall 52. The surface 68 having the same size as the cross-sectional area (Pos. 64 of FIG. 6) of the exhaust gas passage.

FIG. 5 shows schematically a pipe 55 of the mixing chamber 50 shown by FIG. 4 in more detail. The pipe 55 extending through the mixing chamber 50 and connecting through hole 54 of the first wall 51 with through hole 54 of the second wall 52. The pipe 55 is perforated by one or two or more holes 56 opens into the mixing chamber 50. The pipe 55 comprises inside turbulators 57 for increasing the turbulence of the exhaust gas flowing through the pipe, wherein cooling fluid 58 is sucked into the pipe 55 due to the static pressure produced by the flow in the pipe.

Figure 6:
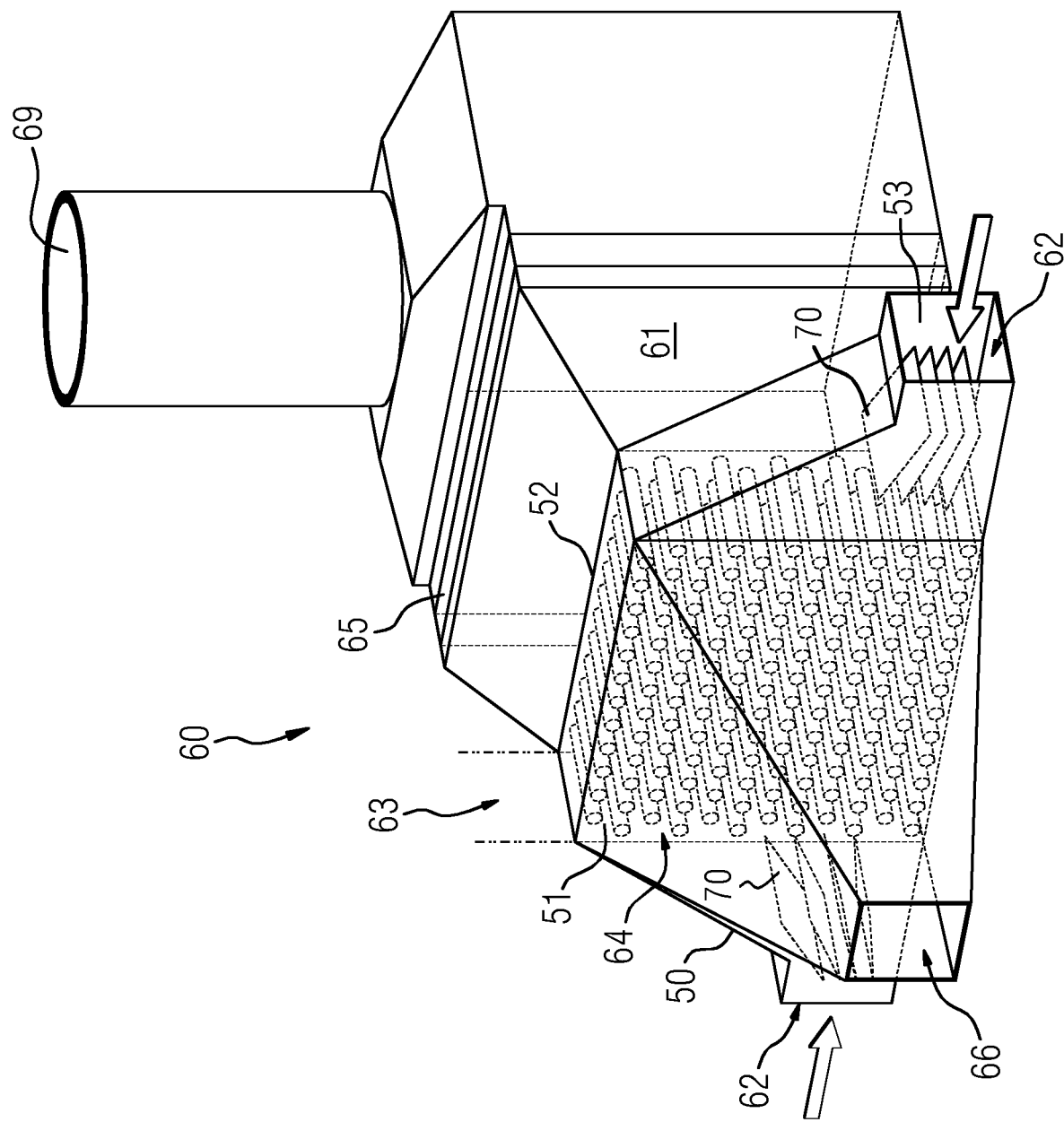

FIG. 6 shows schematically an exhaust duct 60 according to the invention with an exhaust gas passage 61, a cooling fluid passage 62 having vanes 70 positioned within the cooling fluid passage 62, a mixing chamber 50 as shown by FIG. 4 constructed as a section 63 of the exhaust gas passage 61 comprising a first wall 51 and a opposed second wall 52 arranged upstream of a selective catalytic reduction catalyst 65 in the exhaust gas passage 61 and extending over the cross-sectional area 64 of the exhaust gas passage 61. Flue gas, entering the exhaust gas passage 61 at inlet 66 of the exhaust gas passage, is mixed in the pipes of the mixing chamber 50 with cooling fluid and reducing agent from the cooling fluid passage 62 and passing the catalyzer 65 on the way to a downstream exit 69 of the exhaust gas passage 61.

What is claimed is:

1. An exhaust duct, for an engine, the exhaust duct comprising:
   an exhaust gas passage carrying exhaust gas,
   a cooling fluid passage carrying a cooling fluid,
   a mixing device for mixing the cooling fluid with the exhaust gas,
   at least a selective catalytic reduction catalyst arranged in the exhaust gas passage for removing nitrogen oxides, and
   at least one injection nozzle to supply a reducing agent,
   wherein the mixing device comprises a mixing chamber with a first wall and an opposed second wall, the first and second wall arranged upstream of the selective catalytic reduction catalyst in the exhaust gas passage and extending over an entire cross-sectional area of the exhaust gas passage, both walls perforated by through holes, wherein the through holes of the first wall are connected with the through holes of the second wall in pairs by pipes extending through the mixing chamber, the pipes are each perforated by at least one hole into the mixing chamber and the cooling fluid passage ending into the mixing chamber.

2. The exhaust duct according to claim 1, wherein the at least one injection nozzle to supply the reducing agent are arranged such that the reducing agent is supplied into the exhaust duct.

3. The exhaust duct according to claim 2, wherein the at least one injection nozzle to supply the reducing agent is adapted for supplying the reducing agent comprising a urea component and/or an ammonia component.

4. The exhaust duct according to claim 1, wherein the at least one injection nozzle to supply the reducing agent further comprises several injection nozzles to supply the reducing agent.

5. The exhaust duct according to claim 1, wherein the pipes of the mixing chamber each comprise inside at least one turbulator for increasing the turbulence of the exhaust gas flowing through the pipes.

6. The exhaust duct according to claim 1, wherein the sum of a cross-sectional area of the through holes in the first and second wall are adapted to keep a pressure drop between an inlet of the exhaust gas passage and a downstream exit of the exhaust gas passage less or equal than 25 mbar.

7. The exhaust duct according to claim 6, wherein the sum of the cross-sectional area of the through holes is 25% of a surface area of the first and second wall.

8. The exhaust duct according to claim 1, wherein openings of the through holes through the first and second wall are uniformly distributed on a surface of the first and second wall.

9. The exhaust duct according to claim 1, wherein the first wall guides the exhaust gas upstream thereof into the pipes, and wherein in the pipes the exhaust gas mixes with the cooling fluid that enters each pipe via a respective hole of the at least one hole.

10. The exhaust duct according to claim 9, wherein the first wall directs all of the exhaust gas in the exhaust gas passage into the pipes.

11. The exhaust duct according to claim 9, wherein the first wall fluidically separates the exhaust gas in the exhaust gas passage from the cooling air in the mixing chamber.

12. The exhaust duct according to claim 11, wherein the first wall and the second wall define a volume therebetween and within the exhaust gas passage, wherein the pipes are disposed within the volume, and wherein the volume provides fluid communication between the cooling fluid passage and the pipes.

13. The exhaust duct according to claim 1, wherein during operation a static pressure in the pipes is less than a static pressure in the mixing device which thereby causes the cooling fluid to be sucked from the mixing chamber into the pipes.

14. The exhaust duct according to claim 13, wherein an amount of the cooling fluid sucked into the pipes varies according to a velocity of the exhaust gas in the pipes.

15. The exhaust duct according to claim 1, wherein the at least one injection nozzle to supply the reducing agent is adapted to spray the reducing agent.

16. The exhaust duct according to claim 15, wherein the at least one injection nozzle to supply the reducing agent is adapted to spray the reducing agent as a liquid.

17. The exhaust duct according to claim 15, wherein the at least one injection nozzle to supply the reducing agent is adapted to spray the reducing agent as a vapor.

18. The exhaust duct according to claim 1, wherein the engine is a fossil fuel powered engine.

19. A power plant comprising:
   a gas turbine, and
   an exhaust duct for an engine, the exhaust duct comprising
      an exhaust gas passage carrying exhaust gas,
      a cooling fluid passage carrying a cooling fluid,
      a mixing device for mixing the cooling fluid with the exhaust gas,
      at least a selective catalytic reduction catalyst arranged in the exhaust gas passage for removing nitrogen oxides, and
      at least one injection nozzle to supply a reducing agent,
      wherein the mixing device comprises a mixing chamber with a first wall and an opposed second wall, the first and second wall arranged upstream of the selective catalytic reduction catalyst in the exhaust gas passage and extending over an entire cross-sectional area of the exhaust gas passage, both walls perforated by through holes, wherein the through holes of the first wall are connected with the through holes of the second wall in pairs by pipes extending through the mixing chamber, the pipes are each perforated by at least one hole into the mixing chamber and the cooling fluid passage ending into the mixing chamber.

20. The power plant according to claim 19, wherein the gas turbine comprises a simple cycle gas turbine.

21. A mixing chamber for an exhaust duct of an engine for mixing cooling fluid with exhaust gas, the mixing chamber comprising:
   a first wall and an opposed second wall and at least one entrance for a cooling fluid passage of the exhaust duct,
   the first wall and second wall arranged in an exhaust gas passage of the exhaust duct and extending over an entire cross-sectional area of the exhaust gas passage,
   the first and second wall both perforated by through holes, wherein the through holes of the first wall are connected with the through holes of the second wall in pairs by pipes extending through the mixing chamber, the pipes are each perforated by at least one hole into the mixing chamber.

22. The exhaust duct according to claim 21, wherein the engine is a fossil fuel powered engine.

* * * * *